Feb. 8, 1949. J. R. REYBURN 2,460,904
FISHING REEL
Filed March 23, 1945
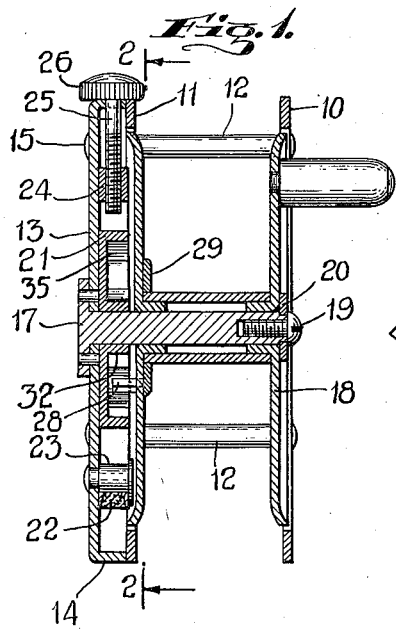
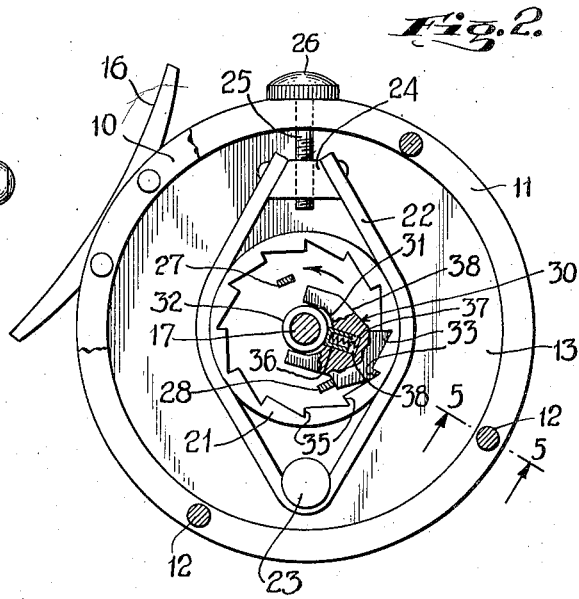
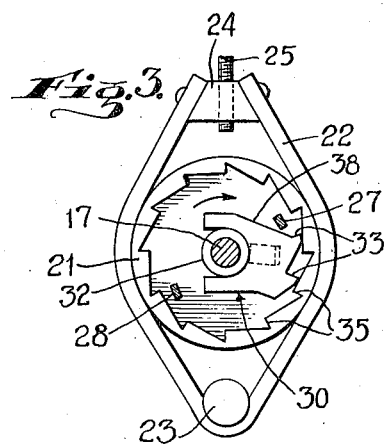
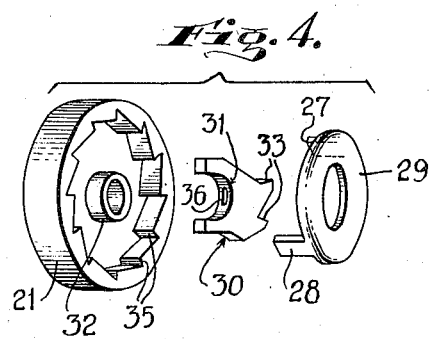
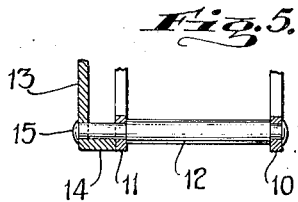
INVENTOR
JOHN R. REYBURN
BY John H. Dillard
ATTORNEY Patented Feb. 8, 1949

2,460,904

UNITED STATES PATENT OFFICE 2,460,904

FISHING REEL

John R. Reyburn, Fairfield, Conn.

Application March 23, 1945, Serial No. 584,277

5 Claims. (Cl. 242—84.5)

This invention relates to fishing reels and more particularly to improvement in the mechanism by which a "drag" is exerted upon the line during unreeling.

It is the primary object of this invention to improve a brake mechanism which exerts a braking effort upon the reel during its movement in a line-unreeling direction.

It is a further object of this invention to provide a drag mechanism which does not hinder rotation of the reel in a winding-up direction.

It is a further object of the present invention to provide a mechanism which exerts a braking effort upon the spool without producing a radial or axial load upon the bearings thereof.

It is a further object of this invention to provide an improved frame structure for the reel.

Referring now to the drawings,

Fig. 1 is a section taken through the center of a reel embodying one form of my present invention;

Fig. 2 is a section of a device shown in Fig. 1 taken on line 2—2 thereof;

Fig. 3 is a fragmentary view of some of the parts shown in Fig. 2 in a different position of operation;

Fig. 4 is an exploded view showing the relative position of some of the parts; and Fig. 5 is a fragmentary partly sectional view taken at 5—5 in Fig. 2.

In fishing for salmon in streams and lakes, as practised by the fishermen who fish for sport as distinguished from those who supply the markets, it is considered part of the sport to take the fish on as light tackle as possible. Because of this, it is necessary to provide some means for tiring the fish without exerting sufficient tension in the line to risk tearing the small hook from the fish's mouth or breaking the line, or, especially, the leader. This has been done in the past by the provision of various braking mechanisms which are intended to produce an effort when the spool is turned in an unreeling direction. It is also customary to have an overrunning clutch which will allow the spool to be turned freely in the opposite direction by the fisherman.

Various braking mechanisms have been tried in the past, but most of them suffer severe disadvantages. Those which depend upon a shoe held in resilient contact with a drum tend to wear the bearings of the spool. Furthermore, because of the arc of contact of such shoes in conjunction with play in the pivot and their hardness, wedging develops and the frictional resistance is very often uneven, giving the reel a rough action as line is taken from the spool.

Another common type of brake mechanism involves the use of a camming action to cause the friction members to press upon the braking surface of the spool. Reels of this type have a disadvantage in that the camming action depends upon a slight residual friction between the spool and the friction elements, and grease or oil getting on the friction elements often decreases this residual friction to such an extent that no camming action takes place, and therefore no braking.

Furthermore, braking action obtained by an axial force against the spool requires a provision to be made in the construction of the reel to absorb the thrust so produced and to provide adjustment for wear.

It is proposed in the present instance to provide a reel in which no thrust is imposed upon the bearings and in which the contact of the braking member is such that the braking effort is constant.

Referring more particularly to the drawings, the reel shown consists of a pair of end rings 10 and 11. These rings are held in spaced relation by pillars 12. Ring 10 is secured to the pillars 12 by means of reduced ends passing through the ring and upset or riveted. The end plate 13 is secured to the pillars by means of the upset portion 15, as shown in Fig. 5. The pillar 12 extends through the ring 11, the ring resting on a shoulder formed on the pillar. The flange 14 of the side plate 13 is held against the end ring 11 by the rivet head 15.

This method of construction is used because the braking effort exerted on the spool is transmitted to the reel seat plate 16 through the side plate 13. The construction shown provides sufficient rigidity with minimum weight to transmit this effort without deforming the reel frame which might result in the spool engaging the frame.

The side plate 13 carries an axle 17 which may be riveted or pinned to this plate. This axle serves as a support for the spool 18 which is held in place by means of a screw 19 and a washer 20 or in any other suitable fashion.

In order to provide a braking resistance, I have provided a brake drum 21 which is free to turn on the axle 17. This brake drum is engaged by a leather or similar band 22. As shown, this band passes around a headed stud 23. The stud is secured to the side plate 13 by upsetting its end, or by any other means. The brake band has its ends secured to a block 24, as by the screws shown. This block has a tapped hole passing through it. Through this tapped hole there is a screw 25 which terminates in a suitable knob 26. By turning the knob 26, the tension on the band 22 can be increased or decreased, which will squeeze the band more tightly against the sides of the drum or release it. This provides for adjustment to suit the needs of the fisherman. It will be noted that the stud permits the band to slide past, with the result that there can never be any resultant side force on the drum due to one part of the band being under greater tension than the other part, regardless of frictional effects or how the band stretches. It is to be understood that there is a small unbalancing due to the fact that adjustment of the block 24 is unaccompanied by a corresponding movement of the stud 23, but this can be kept at a minimum by utilizing material for the band which does not stretch too much. In any event, the side thrust engendered by reason of the different angle of wrap at the stud end from that at the block end is small compared to that which would result from utilizing a single band on one side of the drum.

In order to transmit motion of the spool 18 to the brake drum 21 when the spool is turning in one direction, the pawl mechanism shown is used. A pair of fingers 27 and 28 project from the spool. For convenience these fingers are shown as being part of the washer 29 which is assembled on the spool with the fingers projecting through openings in the side of the spool. These fingers will then rotate with the spool. A pawl mechanism is provided which co-operates with ratchet teeth cut on the interior of the brake drum. In the shown form this pawl consists of a piece 30 which has a slot 31 passing around the hub 32 of the brake drum. A pair of teeth 33 on this pawl engage the teeth 35 on the ratchet. In order to make this engagement certain, a hollow pin 36 containing a spring 37 and itself contained in the hole 38 in the part 30 is provided. This pin urges the teeth of the pawl into engagement with the ratchet teeth, but permits the pawl to disengage the teeth upon rotation of the spool in the winding-up direction. As can be seen by comparing Figs. 2 and 3, rotation of a reel in a counterclockwise direction (Fig. 2) causes engagement between one of the fingers 28 and the pawl, forcing it in a direction to engage two of the ratchet teeth. On the other hand, rotation in the opposite direction (Fig. 3) causes engagement between the finger 27 and the inclined surface 38 and cams the pawl 30 inwardly, thus tending to disengage the teeth of the pawl from the ratchet teeth. This disengagement is aided by the sliding of the pawl over the ratchet teeth in the usual manner. Inasmuch as the drag has to take place when the line is being unwound from the spool, Fig. 2 represents the condition and direction of rotation when the line is being taken from the spool, and Fig. 3 represents the motion when line is being taken onto the spool.

Thus it can be seen that I have provided a reel in which the braking action produces no force on the bearings, and which is relatively simple in construction, which makes for reliability in operation.

It is to be understood that, although I have described the preferred embodiment of my present invention, such description is not to be taken in a limiting sense, and the scope of the present invention is best understood from the following claims.

I claim:

1. A brake mechanism for a fishing reel having a spool mounted on a shaft for rotation including, a drum mounted for rotation on the spool shaft and having ratchet teeth on its interior and a braking surface on its exterior, a pawl having a forked portion straddling said shaft, said pawl being engageable with the ratchet teeth, and means transmitting rotational movement of the spool to the pawl.

2. A brake mechanism for a fishing reel having a spool mounted on a shaft for rotation including: a drum mounted for rotation on the spool shaft, said drum having a braking surface on its exterior, ratchet teeth on its interior and a hub extending into its interior; a pawl having a forked portion straddling said hub, said pawl being engageable with the ratchet teeth; and means transmitting rotational movement of the spool to the pawl.

3. A brake mechanism for a fishing reel having a spool mounted on a shaft for rotation including: a drum mounted for rotation on the spool shaft, said drum having a braking surface on its exterior, ratchet teeth on its interior and a hub extending into its interior; a pawl having a forked portion straddling said hub, said pawl being engageable with the ratchet teeth; means urging said pawl into such engagement, and means transmitting rotation of the spool to the pawl.

4. A brake mechanism for a fishing reel having a spool mounted on a shaft for rotation including: a drum mounted for rotation on the spool shaft, said drum having a braking surface on its exterior, ratchet teeth on its interior and a hub extending into its interior; a pawl having a forked portion straddling said hub, said pawl being engageable with the ratchet teeth; means urging said pawl into such engagement, said means comprising a spring driven pin engaging said hub; and means transmitting rotation of the spool to the pawl.

5. A fishing reel having a removable spool mounted on a shaft, said spool having a projection extending from one side thereof, a drum mounted for rotation around the axis of said shaft having ratchet teeth on its interior and a braking surface on its exterior, a pawl mounted interiorly of the drum and rotatable with respect thereto, said pawl engaging said teeth, the projection from the spool having a path of motion which causes it to engage the pawl upon rotation of the spool.

JOHN R. REYBURN.

REFERENCES CITED

The following references are of record in the file of this patent:

UNITED STATES PATENTS

| Number | Name | Date |
|---|---|---|
| 2,079,054 | Vadaz | May 4, 1934 |
| 2,331,210 | Lundblad | Oct. 5, 1943 |

FOREIGN PATENTS

| Number | Country | Date |
|---|---|---|
| 279,275 | Germany | Apr. 18, 1913 |
| 391,316 | Great Britain | Apr. 27, 1933 |